Sept. 2, 1941. A. FINSTERWALDER 2,254,426

INDIVIDUAL AXLE DRIVE FOR DIRECT-DRIVEN DIESEL LOCOMOTIVES

Filed March 25, 1939

Inventor:
Albert Finsterwalder

Patented Sept. 2, 1941

2,254,426

UNITED STATES PATENT OFFICE 2,254,426

INDIVIDUAL AXLE DRIVE FOR DIRECT-DRIVEN DIESEL LOCOMOTIVES

Albert Finsterwalder, Cologne-Bruck, Germany, assignor to Klöckner-Humboldt-Deutz Aktiengesellschaft, Cologne-Deutz, Germany, a corporation of Germany Application March 25, 1939, Serial No. 264,112
In Germany March 30, 1938

1 Claim. (Cl. 105—115)

The invention relates to an individual axle drive for direct driven Diesel locomotives, particularly those of high power, wherein the individual Diesel engines are mounted transversely to the direction of travel upon a frame supported by bearings journalled upon axles extending outwardly from the wheels, the axles being driven through gears and universal joint couplings positioned outside the frame, each gear drive being enclosed in an oil-tight gear casing rigidly fastened to the locomotive frame.

In Diesel locomotives of this type heretofore known, the universal joint couplings, which compensate for the spring play of the axles, have been built into the driving wheels. This has the disadvantage, that the driving gears are not enclosed on all sides, that is, they are not encased in an oil-tight housing. This difficulty has been overcome by the use of hollow shafts. However, such a drive is complicated and expensive.

The object of the invention is to overcome the disadvantages described. This is achieved by positioning the universal joint couplings in the opening between the gear casing and the locomotive frame.

The drawing shows one illustrative form of the invention by way of example.

Figure 1:
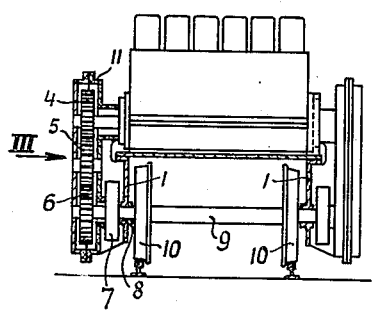
Fig. 1 is a somewhat diagrammatic vertical cross section of the locomotive.
Figure 3:
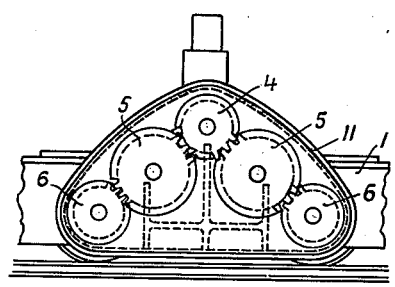
Fig. 3 is a side elevation of a portion of the locomotive, viewed in the direction of the arrow III of Fig. 1.
Figure 2:
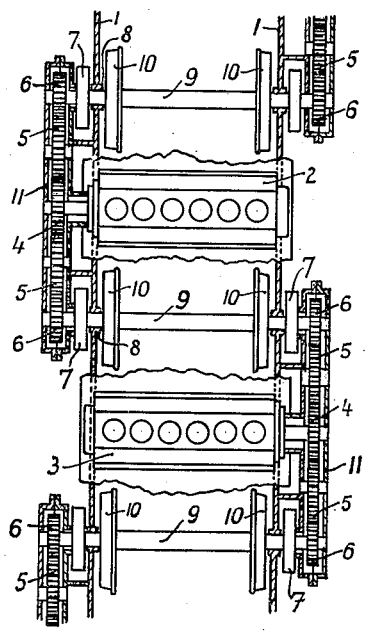
Fig. 2 is a plan view of a portion of the locomotive, with the gear housings cut away.

In Figs. 1 to 3, illustrating a Diesel locomotive of high power, with each driving axle individually driven, only two driving units are shown. The locomotive has an outer frame 1, upon which stand the transverse Diesel engines 2, 3, etc. The Diesel engines 2 and 3 act directly upon the driving axles 9 of the driving wheels 10, through gear wheels 4, 5 and 6 and universal joint couplings 7 mounted outside the frame 1; the driving axles 9 being extended out through the axle bearings 8 for connection with the universal joint couplings. The driving gears 4, 5 and 6 located outside the locomotive frame 1 are enclosed by oil-tight gear casings 11 provided for each driving unit. The gear casings are rigidly connected to the locomotive frame 1, while the universal joint couplings 7 are arranged open between the gear casings 11 and the locomotive frame 1.

In regard to the arrangement of the Diesel engines 2, 3, etc., with respect to the axles 9, there are various possibilities. The drive can be so constructed that over each driving axle there is mounted one Diesel engine and that the latter drives the axle either at one side or at both sides of the locomotive. It can also be arranged so that one Diesel engine drives two axles, these also being driven either at one side or both sides. In the one side drive, in each case, the drive can be provided alternately at the right and the left. In the illustrative embodiment shown the arrangement is such that two neighboring Diesel engines act jointly upon the axle positioned between them. The drive from one engine is at the right side and from the other at the left side. This construction has the advantage that racing of the Diesel engine as a result of the skidding of the driving wheels cannot occur because the Diesel engines are positively interconnected.

I claim:

In a Diesel locomotive, driving axles, pairs of wheels fixed to the respective axles in position to leave extending axle ends outside of each wheel, a locomotive frame having bearings in which said extending axle ends are journalled, transversely arranged Diesel engines mounted on said locomotive frame, and individual driving connections between said Diesel engines and said extending axle ends comprising gear wheels and universal joint couplings all positioned outside said locomotive frame, and oil-tight gear casings enclosing said gear wheels, rigidly secured to said locomotive frame, said universal joint couplings being located in the open between said gear casings and said locomotive frame.

ALBERT FINSTERWALDER.